July 19, 1938.   F. H. STROUP   2,124,407
AUXILIARY EXHAUST VALVE
Filed May 22, 1937
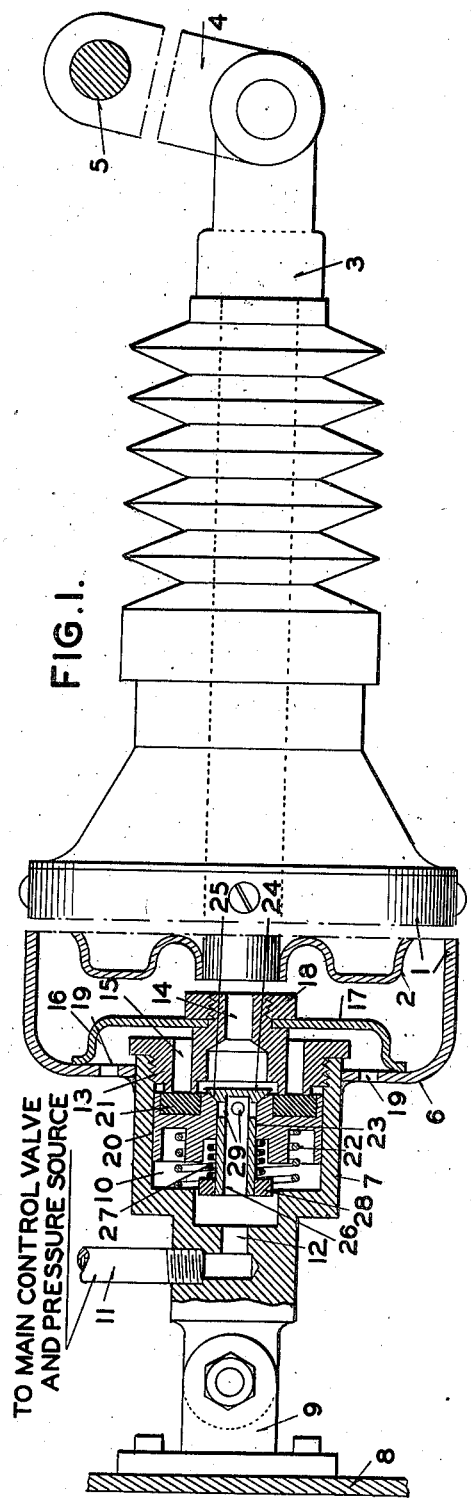
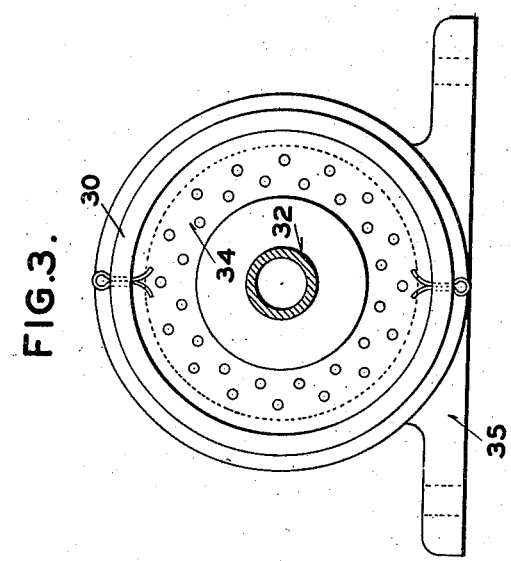
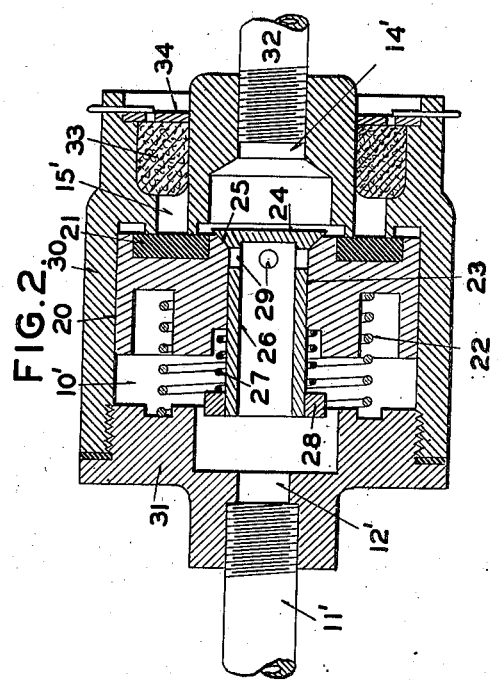
INVENTOR.
FRED H. STROUP
BY
E. E. Huffman
ATTORNEY.

UNITED STATES PATENT OFFICE 2,124,407

AUXILIARY EXHAUST VALVE

Fred H. Stroup, Kirkwood, Mo., assignor to Wagner Electric Corporation, St. Louis, Mo., a corporation of Delaware Application May 22, 1937, Serial No. 144,127

10 Claims. (Cl. 303—69)

My invention relates to valves for fluid pressure systems, as for example, fluid pressure brake actuating systems employed on vehicles, and one of the objects is to provide an improved auxiliary exhaust valve for association with a fluid motor remote from a main control valve whereby fluid under pressure may be quickly released from said fluid motor at a point adjacent thereto.

A more specific object of my invention is to combine the auxiliary exhaust valve with the fluid motor so that the air under pressure in the fluid motor will be exhausted directly from the motor to atmosphere without passage through any of the conduits of the fluid pressure system when the pressure in the conduits is released through the main control valve.

Another object of my invention is to so construct an auxiliary exhaust valve that it will be maintained positively fluid-tight when fluid under pressure is being applied from the pressure source through the main control valve to the remote fluid motor but will be capable of quickly and efficiently releasing the fluid under pressure in the fluid motor when the main control valve is moved to a position to release the fluid under pressure.

Other objects of my invention will become apparent from the following description taken in connection with the accompanying drawing in which Figure 1 is a partial cross-sectional view of a fluid pressure actuating motor, showing my improved valve mechanism combined therewith; Figure 2 is a cross-sectional view of an auxiliary exhaust valve mechanism for insertion in a fluid conduit; and Figure 3 is an end view of the valve mechanism shown in Figure 2.

Referring to Figure 1, the fluid actuating motor with which my improved auxiliary exhaust valve is combined comprises a cylinder 1 in which is reciprocable a piston 2 having a piston rod 3 for connection with an arm 4 carried by a shaft 5 which may be a cross shaft for actuating the brake assemblies of a vehicle in a well-known manner or any other shaft for actuating some kind of mechanism. The head end 6 of the cylinder has secured thereto, as by welding, a member 7 whereby the cylinder may be pivotally connected to a support 8 by a bracket 9.

The member 7 is provided with a cylindrical chamber 10 which is in communication with the conduit 11 by means of inlet passage 12, the conduit being connected to a source of pressure through any suitable main control valve of known construction (not shown). The inner end of chamber 10 is closed by a plug 13 through which is an outlet passage 14 entering cylinder 1. The plug is also provided with exhaust passages 15 which enter a chamber 16 formed by a plate 17 secured to the head of the cylinder and to the inner end of the plug by a nut 18, the chamber being in constant communication with the atmosphere by openings 19 in the head of the cylinder.

A piston 20 is slidably mounted in chamber 10 and this piston carries an annular rubber valve element 21 for closing the exhaust passages 15 when the piston is at the right end of the chamber where it is normally biased by a light spring 22. The piston 20 has a central passage 23 therethrough and controlling this passage is a valve element 24 cooperating with a seat 25 at the end of the passage. The valve element has a hollow stem 26 and is normally biased to a closed position by a very light spring 27 interposed between a shoulder 28 on the end of the stem and the piston. Openings 29 in the stem permit fluid to flow through the stem and past the piston when the valve element is unseated by a movement in a direction toward the outlet passage 14.

In operation the normal positions of the parts of the valve mechanism are as shown. When it is desired to operate the fluid motor, fluid under pressure is admitted to chamber 10 through conduit 11 by the main control valve (not shown). This will cause valve element 24 to be immediately unseated and the fluid to flow directly into cylinder 1 to move the piston therein. When the pressures on the opposite sides of piston 20 are substantially equal, valve element 24 will seat under the action of its spring 27. When it is desired to release the fluid under pressure in the cylinder, the main control valve is moved to its exhaust position in the usual manner which causes a drop in pressure of the fluid on the left side of piston 20. The piston will now be forced to the left by the greater pressure of the fluid in the cylinder and the exhaust passages 15 uncovered to permit the fluid under pressure in the cylinder to exhaust to atmosphere by way of chamber 16 and opening 19.

From the above description it is seen that by having my improved auxiliary exhaust valve combined with the fluid motor in the manner shown, the fluid can be quickly exhausted from the motor directly to atmosphere. This is very advantageous where the fluid motor may be positioned at a remote distance from the main control valve as would be the case in fluid pressure brake actuating systems for vehicles, especially vehicles such as the tractor-trailer combination type where the fluid motors for the trailer brakes are a considerable distance from the main control valve which is usually in the operator's compartment on the tractor. If the auxiliary valve were not employed, it would be necessary to exhaust the remote fluid motors through the main control valve which would consume considerable time.

Referring to Figures 2 and 3, I have shown a modification of the auxiliary exhaust valve which permits it to be inserted in the fluid pressure conduit adjacent the fluid motor instead of combined with the cylinder head. The valve casing 30 is closed at one end by a plug 31 which is provided with an inlet passage 12' communicating with conduit 11' leading from the main control valve and the source of pressure. The other end of the casing is provided with an outlet passage 14' which communicates with conduit 32 leading to the fluid motor and also an exhaust passage 15' communicating directly with the atmosphere. Dust is excluded from the exhaust passage by the cleaner material 33 held in place by a perforated annular plate 34. The valve casing is also provided with an integral base plate 35 whereby it may be secured to a suitable support. The valve mechanism within the cylindrical chamber 10' of casing 30 is identical with that employed in chamber 10 of the construction shown in Figure 1 and additional description thereof is unnecessary. The parts are identified by the same reference characters.

The valve mechanism of Figures 2 and 3 operates the same as that shown in Figure 1. Fluid under pressure is admitted to conduit 32 and the fluid motor (not shown) from conduit 11' and the source of pressure by the opening of valve element 24 when the main control valve is operated. When the fluid pressure is released at the main control valve, piston 20 will be forced to the right by the greater fluid pressure on the right side thereof, thus placing conduit 32 in direct communication with the atmosphere through exhaust passage 15'.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In an exhaust valve mechanism, a casing provided with a chamber having an inlet port, an outlet port and an exhaust port adjacent the outlet port, a movable member extending across said chamber and interposed between the inlet port and the outlet and exhaust ports, said member being provided with a passage through its body portion, valve means governed by the movement of the movable member and controlling the exhaust port, means for biasing the movable member to a position where the exhaust port will be closed, a valve element for controlling the passage in the movable member, said valve element adapted to be unseated by a movement in a direction toward the outlet port, and means for biasing the last named valve element toward a closed position.

2. In an exhaust valve mechanism, a casing provided with a chamber having an inlet port, an outlet port and an exhaust port adjacent the outlet port, a piston reciprocable in said chamber and interposed between the inlet port and the outlet and exhaust ports, said piston being provided with a passage therethrough, means mounted on and movable with the piston for controlling the exhaust port, a spring for biasing the piston to a position where the exhaust port will be closed, a valve element for controlling the piston passage, said valve element adapted to be unseated by a movement in a direction toward the outlet port, and a spring for biasing the last named valve element toward a closed position.

3. In an exhaust valve mechanism, a cylindrical casing having an inlet port at one end, a centrally positioned outlet port at the other end and exhaust ports surrounding the outlet port, a piston reciprocable in said chamber and provided with a central passage therethrough, an annular rubber valve element mounted on and movable with the piston for controlling the exhaust ports, a spring for biasing the piston to a position where the exhaust ports will be closed, and a valve element carried by the piston for controlling the piston passage.

4. In an exhaust valve mechanism, a cylindrical casing having an inlet port at one end, a centrally positioned outlet port at the other end and exhaust ports surrounding the outlet port, a piston reciprocable in said chamber and provided with a central passage therethrough, an annular rubber valve element mounted on and movable with the piston for controlling the exhaust ports, a spring for biasing the piston to a position where the exhaust ports will be closed, a valve element carried by the piston for controlling the piston passage, said valve element having a stem extending through the passage and provided with a shoulder on its end, and a spring interposed between the stem shoulder and the piston for biasing the valve element to closed position, said valve element adapted to be moved to open position by a movement in a direction toward the outlet port of the casing.

5. In mechanism of the class described, a cylinder, a piston reciprocable therein, a chambered member secured to the head of the cylinder, a movable member in said chamber for dividing said chamber into two compartments, said chambered member being provided with an inlet port for connecting the chamber on one side of the movable member to a source of pressure and an outlet port and an exhaust port for placing the chamber on the other side of the movable member in direct communication with the cylinder and with the atmosphere respectively, valve means governed by the movement of said member for controlling the exhaust port, said valve means being in closed position when the pressure on the inlet side of the movable member is a predetermined degree greater than that on the outlet side and in open position when the pressure on the outlet side is a predetermined degree greater than that on the inlet side, and a valve-controlled passage permitting fluid to flow from the inlet side of the chamber to the outlet side but preventing flow in the reverse direction.

6. In mechanism of the class described, a cylinder, a piston reciprocable therein, a chambered member secured to the head of the cylinder, a movable member in said chamber for dividing said chamber into two compartments, said chambered member being provided with an inlet port for connecting the chamber on one side of the movable member to a source of pressure and an outlet port and an exhaust port for placing the chamber on the other side of the movable member in direct communication with the cylinder and with the atmosphere respectively, a valve element mounted on and movable with said member for controlling the exhaust port, said valve means being in closed position when the pressure on the inlet side of the movable member is a predetermined degree greater than that on the outlet side and in open position when the pressure on the outlet side is a predetermined degree greater than that on the inlet side, a spring for biasing the movable member to a position where the valve element is in closed position, means forming a passage through the movable member, and a valve for permitting fluid to flow from the inlet side of the chamber to the outlet side but preventing flow in the reverse direction.

7. In mechanism of the class described, a cylinder, a piston reciprocable therein, a support, a chambered member rigidly secured to the head of the cylinder and pivotally connected to the support, a movable member in said chamber for dividing said chamber into two compartments, said chambered member being provided with an inlet port for connecting the chamber on one side of the movable member to a source of pressure and an outlet port and an exhaust port for placing the chamber on the other side of the movable member in direct communication with the cylinder and with the atmosphere respectively, valve means governed by the movement of said member for controlling the exhaust port, said valve means being in closed position when the pressure on the inlet side of the movable member is a predetermined degree greater than that on the outlet side and in open position when the pressure on the outlet side is a predetermined degree greater than that on the inlet side, and a valve-controlled passage permitting fluid to flow from the inlet side of the chamber to the outlet side but preventing flow in the reverse direction.

8. In mechanism of the class described, a cylinder, a piston reciprocable therein, a chambered member secured to the head of the cylinder, said member having an inlet port connected to a source of pressure, an outlet port communicating directly with the cylinder and an exhaust port adjacent the outlet port communicating with the atmosphere, a piston reciprocable in said chamber and interposed between the inlet port and the outlet and exhaust ports, said piston being provided with a passage therethrough, means mounted on and movable with the piston for controlling the exhaust port, a spring for biasing the piston to a position where the exhaust port will be closed, a valve element for controlling the piston passage, said valve element adapted to be unseated by a movement in a direction toward the outlet port, and a spring for biasing the last named valve element toward a closed position.

9. In mechanism of the class described, a cylinder, a piston reciprocable therein, a support, a chambered member rigidly secured to the head of the cylinder and pivotally connected to the support, said member having an inlet port connected to a source of pressure, an outlet port communicating directly with the cylinder and an exhaust port adjacent the outlet communicating with the atmosphere, a piston reciprocable in the chamber and interposed between the inlet port and the outlet and exhaust ports, said piston being provided with a central passage therethrough, a rubber valve element mounted on and movable with the piston for controlling the exhaust port, a spring for biasing the piston to a position where the exhaust port will be closed, and a valve carried by the piston and movable therewith for controlling the piston passage.

10. In mechanism of the class described, a cylinder, a piston reciprocable therein, a chambered member secured to the head of the cylinder, the chamber of said member being provided with an inlet passage at one end for connection with a source of pressure, a plug for the other end of the chamber and having a portion extending into the cylinder, said plug being provided with an exhaust port and with an outlet passage for placing the chamber in communication with the cylinder and with an exhaust port, a cup-shaped plate secured to the plug and the inner end wall of the cylinder and forming a chamber which communicates with the exhaust port, means for placing said last named chamber in communication with the atmosphere, and valve mechanism within said chambered member for closing the exhaust port and permitting fluid under pressure to flow from the inlet passage to the outlet passage when the pressure at the inlet is greater by a predetermined degree than that at the outlet and for opening the exhaust port and preventing fluid from flowing from the outlet to the inlet when the pressure at the outlet is greater by a predetermined degree than that at the inlet.

FRED H. STROUP.